A. D. CONVERSE.
VEHICLE.
APPLICATION FILED FEB. 29, 1916.
1,193,765.
Patented Aug. 8, 1916.
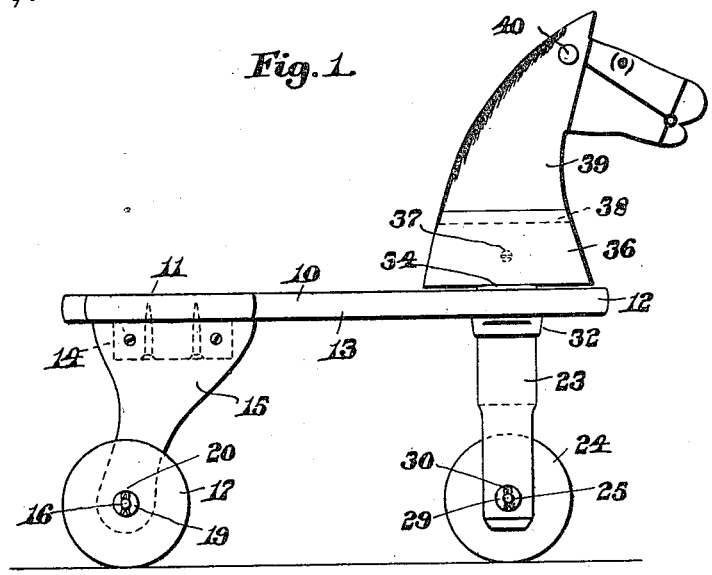
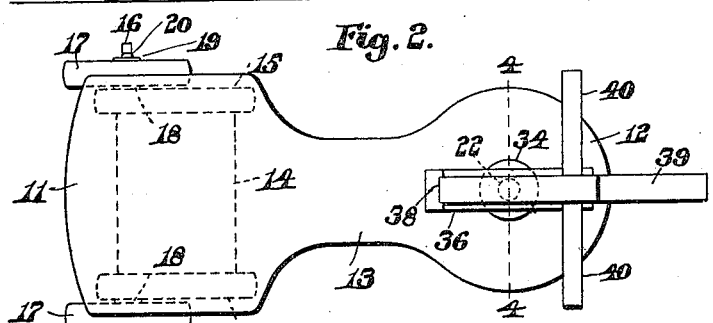
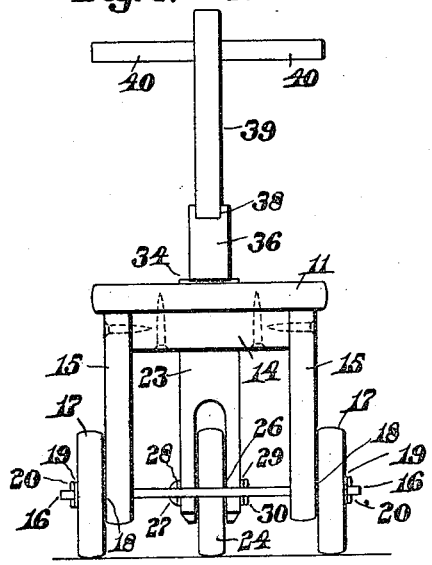
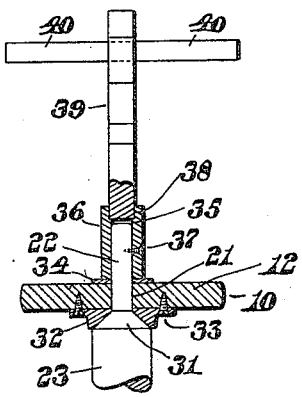
Inventor:
Atherton D. Converse,
by Walter E. Lombard,
Atty

UNITED STATES PATENT OFFICE.

ATHERTON D. CONVERSE, OF WINCHENDON, MASSACHUSETTS.

VEHICLE.

1,193,765.　　　　Specification of Letters Patent.　　Patented Aug. 8, 1916.

Application filed February 29, 1916.　Serial No. 81,513.

*To all whom it may concern:*

Be it known that I, ATHERTON D. CONVERSE, a citizen of the United States of America, and a resident of Winchendon, in the county of Worcester and State of Massachusetts, have invented certain new and useful Improvements in Vehicles, of which the following is a specification.

This invention relates to vehicles and particularly to that class of vehicles designed for use by small children.

The invention consists of a seat supported at the rear by two wheels and provided with a front steering wheel having oscillating means therefor above the seat, said seat being so positioned that the occupant thereof may propel the vehicle by means of the feet contacting with the surface over which said vehicle is moving.

The invention further consists in a novel construction of the steering means.

The invention further consists in certain novel features of construction and arrangement of parts which will be fully understood by reference to the description of the drawings and to the claims hereinafter given.

Of the drawings: Figure 1 represents an elevation of a vehicle embodying the principles of the present invention. Fig. 2 represents a plan of the same. Fig. 3 represents a rear elevation of the same, and Fig. 4 represents a sectional detail of the steering device.

Similar characters designate like parts throughout the figures of the drawings.

In the drawings, 10 is a seat member having a widened portion 11 at the rear thereof and a circular portion 12 at the front thereof. The rear and front portions 11 and 12 respectively are connected by an intermediate narrower portion 13. Secured to the under side of the rear portion 11 is a block 14 to the opposite ends of which are secured depending members 15. Through the lower ends of said depending members 13 extends a rod 16. On each end of the rod 16 is a wheel 17 positioned outside of the depending members 15, and having a washer 18 interposed between each wheel 17 and the outer face of said depending member 15. On the outer ends of the rods 16 are other washers 19 contacting with the outer faces of the wheels 17. The wheels 17 and washers 18 and 19 are retained upon the rod 16 by means of the cotter pins 20. In the center of the circular front portion 12 of the seat member 10 is a cylindrical opening 21 through which extends a shank 22 of a steering pillar 23, the lower end of which is bifurcated and has mounted therein a steering wheel 24. This wheel 24 is revoluble upon a headed bolt 25 extending through the bifurcated end of the steering pillar 23. Washers 26 are interposed between the outer faces of the wheel 24 and the inner faces of the bifurcated end of the steering pillar 23.

Between the heads 27 of the bolt 25 and the outer face of the steering pillar 23 is a washer 28 and on the opposite end of said bolt is another washer 29, outside of which is a cotter pin 30 extending through the bolt 25 and retaining the wheel 24 and washers 26, 28, and 29 in position. The upper end of the steering pillar 23 is cone-shaped as at 31, this conical end being positioned within the cup-shaped member 32 secured by means of screws or other securing members 33 to the under face of the seat portion 10.

Surrounding the shank 22 of the steering member 23 is a washer 34 resting upon the upper face of the seat member 10. The shank 22 extends into a cylindrical opening 35 in a flat-sided block 36 secured to said shank 22 by means of the screw 37, the under edge of said block resting upon the washer 34. The upper edge of said block 36 is provided with a longitudinal groove 38 in which is secured a steering head 39, this head preferably being cut out in the outline of the head of a horse or other animal.

Extending laterally from the opposite sides of the steering head 39 are the handles 40 by which the steering pillar 23 may be moved about its axis. The seat portion 10 is located above the surface over which the vehicle is to be moved just enough to permit the feet of the operator to touch the ground and thereby permit him to push the vehicle along, at the same time controlling the direction of the vehicle by regulating the movement of the steering device by means of the handles 40.

Normally, when moving the steering head, the sides of the block 36 are parallel to the length of the seat 10 and the circular portion 12 at the front of said seat extends outwardly from the sides of said block sufficiently to support the legs of the occupant of the seat. This provides a means whereby when on an incline the child using the vehicle may coast downhill and control the direction of movement of the vehicle by means of the legs if desired. If desired, the occupant of the seat could support his legs upon the front portion 12 and direct the movement of the vehicle by means of the handles 40.

This makes a very simple construction of vehicle intended for use by small children, while at the same time it is very strong and durable.

Owing to the manner in which the wheels are mounted upon depending members 23 and in the bifurcated steering pillar 23, the wheels are permitted to freely turn without the use of lubricants or greases which would soil the clothing of the child using the vehicle.

It is believed that the operation and many advantages of this invention will be fully understood from the foregoing description.

Having thus described my invention, I claim:

1. In a device of the class described, the combination of a plurality of revoluble wheels; a flat seat supported thereby at both ends and at a height permitting the occupant thereof to use the feet as a propelling force by engaging said feet with the surface upon which said wheels rest; a flat-sided steering member extending above said seat with the side walls extending longitudinally of said seat and at considerable distance from the outer edges thereof whereby the vehicle may be steered by the legs when coasting; and other means secured to said steering member whereby said member may be controlled by hand.

2. In a device of the class described, the combination of a seat member having widened portions at the front and rear ends connected by a narrow intermediate portion; a pair of depending members at the rear thereof; a pair of wheels supported by said depending members; an oscillating steering member having a shank formed integral therewith extending through the front portion of said seat; a wheel mounted in the bifurcated lower end of said oscillating member; a flat sided member secured to said shank above said seat and provided with a groove in its upper edge; a washer surrounding said shank between said seat and said grooved member; an upwardly extending member with its lower edge permanently mounted in said groove; and handles extending from opposite faces of said upwardly extending member.

3. In a device of the class described, the combination of a plurality of revoluble wheels; a flat seat supported thereby at both ends and at a height permitting the occupant thereof to use the feet as a propelling force by engaging said feet with the surface upon which said wheels rest; a flat-sided steering member extending above said seat with the side walls extending longitudinally of said seat and at considerable distance from the outer edges thereof whereby the vehicle may be steered by the legs when coasting, the under edge of said steering member being slightly above the upper face of the front portion of said flat seat.

Signed by me at Winchendon, Mass., this 26th day of February, 1916.

ATHERTON D. CONVERSE.

Witnesses:
ARTHUR F. EVANS,
KATHLEEN R. HAMBLETT.

Copies of this patent may be obtained for five cents each, by addressing the "Commissioner of Patents, Washington, D. C."